(12) United States Patent
Zeng et al.

(10) Patent No.: US 11,937,169 B2
(45) Date of Patent: Mar. 19, 2024

(54) MOBILE OFFICE REALIZATION METHOD, APPARATUS, DEVICE, AND MEDIUM

(71) Applicant: GUIZHOU BAISHANCLOUD TECHNOLOGY CO., LTD., Guiyang (CN)

(72) Inventors: Dongfang Zeng, Guiyang (CN); Hui Miao, Guiyang (CN)

(73) Assignee: GUIZHOU BAISHANCLOUD TECHNOLOGY CO., LTD., Guiyang (CN)

( * ) Notice: Subject to any disclaimer, the term of this patent is extended or adjusted under 35 U.S.C. 154(b) by 461 days.

(21) Appl. No.: 17/280,468

(22) PCT Filed: Sep. 27, 2019

(86) PCT No.: PCT/CN2019/108444
§ 371 (c)(1),
(2) Date: Mar. 26, 2021

(87) PCT Pub. No.: WO2020/063830
PCT Pub. Date: Apr. 2, 2020

(65) Prior Publication Data
US 2021/0352568 A1 Nov. 11, 2021

(30) Foreign Application Priority Data
Sep. 28, 2018 (CN) .......................... 201811139620.8

(51) Int. Cl.
*H04B 7/00* (2006.01)
*H04L 67/12* (2022.01)
(Continued)

(52) U.S. Cl.
CPC ............. *H04W 48/02* (2013.01); *H04L 67/12* (2013.01); *H04W 12/06* (2013.01); *H04L 67/10* (2013.01)

(58) Field of Classification Search
CPC ..... H04W 48/02; H04W 12/06; H04W 12/03; H04W 12/088; H04W 4/30; H04W 12/02;
(Continued)

(56) References Cited

U.S. PATENT DOCUMENTS 8,156,231 B2 * 4/2012 Bellifemine ........ H04W 12/033
709/225
10,033,785 B2 7/2018 Lee et al.
(Continued)

FOREIGN PATENT DOCUMENTS

CN 101789968 A 7/2010
CN 102184477 A 9/2011
(Continued)

OTHER PUBLICATIONS

World Intellectual Property Organization (WIPO) International Search Report for PCT/CN2019/108444 dated Jan. 3, 2020 7 Pages.
(Continued)

*Primary Examiner* — Amancio Gonzalez
(74) *Attorney, Agent, or Firm* — ANOVA LAW GROUP, PLLC (57) ABSTRACT

A mobile office realization method includes receiving a mobile office access request from a mobile office device, determining a target network of the mobile office access request, sending the mobile office access request to the target network, receiving, from the target network, response data of the mobile office access request obtained by the target network, and sending the response data to the mobile office device.

17 Claims, 2 Drawing Sheets

(51) Int. Cl.
  *H04W 12/06* (2021.01)
  *H04W 48/02* (2009.01)
  *H04L 67/10* (2022.01)

(58) Field of Classification Search
  CPC ..... H04L 67/12; H04L 67/10; H04L 63/0272; H04L 63/083; H04L 63/10
  USPC .......................................................... 370/310
  See application file for complete search history.

(56) References Cited

U.S. PATENT DOCUMENTS

| | | | |
|---|---|---|---|
| 10,425,307 B2* | 9/2019 | Kato | H04L 65/762 |
| 10,728,594 B2* | 7/2020 | Yu | H04N 21/23106 |
| 11,223,500 B2* | 1/2022 | Damola | H04L 61/5007 |
| 2009/0019134 A1 | 1/2009 | Bellifemine et al. | |
| 2018/0091481 A1 | 3/2018 | Mehta et al. | |
| 2018/0270201 A1 | 9/2018 | Chanak et al. | |
| 2019/0058689 A1* | 2/2019 | Chen | H04L 61/256 |
| 2019/0342289 A1 | 11/2019 | Zhu et al. | |

FOREIGN PATENT DOCUMENTS

| | | |
|---|---|---|
| CN | 106453094 A | 2/2017 |
| CN | 107347085 A | 11/2017 |
| CN | 107566196 A | 1/2018 |
| CN | 107579965 A | 1/2018 |
| CN | 108023973 A | 5/2018 |
| CN | 108133142 A | 6/2018 |
| CN | 108337677 A | 7/2018 |
| CN | 108551464 A | 9/2018 |
| CN | 208656807 U | 3/2019 |
| CN | 208656813 U | 3/2019 |
| CN | 208656814 U | 3/2019 |

OTHER PUBLICATIONS

The China National Intellectual Property Administration (CNIPA) The First Office Action for Chinese Application 2201811139620.8 dated Apr. 15, 2023 10 Pages (With Translation).
India Intellectual Property Patent Office Examination Report for Application No. 202127014768 dated Apr. 2, 2022 6 Pages.
Intellectual Property Office of Singapore The Office Action for Application No. 11202103173R dated Aug. 25, 2022 9 pages.

* cited by examiner

MOBILE OFFICE REALIZATION METHOD, APPARATUS, DEVICE, AND MEDIUM

CROSS-REFERENCE TO RELATED APPLICATIONS

The present application is a national stage entry under 35 U.S.C. § 371 of International Application No. PCT/CN2019/108444, filed Sep. 27, 2019, which claims priority to Chinese Patent Application No. 201811139620.8, filed to the CNIPA on Sep. 28, 2018, titled "Mobile office realization Method and System," the entire contents of both of which are incorporated herein by reference.

TECHNICAL FIELD

The present application relates to, but is not limited to, the technical field of Internet, and in particular to a mobile office realization method, apparatus, device and medium.

BACKGROUND

Mobile office, a brand-new office mode, can free office workers from the shackles of time and space to smoothly interact with other office workers anytime and anywhere, making the working process easier and more efficient and realizing more coordinated and efficient overall operation. With the gradual increase in the use of mobile phones, the establishment of an enterprise software application system for the interconnection between mobile phones and computers by using mobile information software of the mobile phones enables getting free from the shackles of time and space and company management and communication at anytime and anywhere, which effectively improves the management efficiency and promotes the growth of enterprise benefits.

There are two problems that need to be addressed in mobile office as opposed to handling official business through an enterprise Intranet.

Security: When handling official business through the enterprise Intranet, data security is more controllable as the data all flow in the Intranet. In case of mobile office, the data security is compromised very easily as mobile office workers access the internal data of the enterprise directly from the outside.

Smooth access: When handling official business through the enterprise Intranet, smooth access to internal services may be usually achieved through the Intranet, and there are also solutions for accessing cloud computer rooms and SaaS services. The impact of network instability caused by cross-network and cross-region access is very great due to the uncertainty of addresses and networks.

At present, there are two main solutions for mobile office.

The first is to provide ingresses for directly accessing internal services of an enterprise from public networks, similar to the solution in a Web site, which enables all users to access from the public networks directly. Usually, the security of intermediate transmission is guaranteed by providing https services, but Web sites are easily scanned by hackers, and any vulnerability of the platform or framework may pose a very high risk of leakage to core data. In addition, when workers make cross-region and cross-operator access to services of their enterprise, the access speed may not be guaranteed, and problems such as slow and unstable access may occur.

The second is to purchase a third-party VPN service, deploy a VPN server at the headquarters, install a VPN client at a mobile office terminal, and set up a virtual channel between the VPN client and the VPN server, so that all requests for access to services of the headquarters will be transmitted to the VPN server through the virtual channel, and then forwarded to an Intranet server of the enterprise. This solution may effectively solve the problem of enterprise's service security, but it is troublesome for users to use, and login and authentication are required each time. Moreover, there are also problems that when workers make cross-region and cross-operator access to services of their enterprise, the access speed may not be guaranteed, and problems such as slow and unstable access may occur.

Therefore, it is needed to provide a new solution to solve the problems in security and access experience of mobile office.

SUMMARY

To overcome the problems in related technologies, the present application provides a mobile office realization method and device.

According to one aspect of the present application, a mobile office realization method is provided, including:
step 1, a mobile office device sending a mobile office access request to an acceleration network;
step 2, the acceleration network determining a target network of the mobile office access request and sending the mobile office access request to the target network;
step 3, the target network obtaining response data of the mobile office access request and sending the response data to the acceleration network; and
step 4, the acceleration network sending the response data to the mobile office device.

Wherein, before the step 1, the method further comprises:
the acceleration network receiving a registration request from the mobile office device and assigning an access permission for the mobile office device;
after the step 1 and before the step 2, the method further comprises: the acceleration network verifying whether the mobile office device is registered and has the access permission, and preforming the step 2 when verifying that the mobile office device is registered and has the access permission.

Wherein, in the step 2, after the acceleration network determines the target network of the mobile office access request, the method further comprises: determining the type of the target network, and when the target network is a private network, determining an address of Customer Premise Equipment CPE in the private network;
in the step 2, sending the mobile office access request to the target network comprises: a network access point nearest to the private network in the acceleration network sending the mobile office access request to the CPE in the private network; and
in the step 3, the target network obtaining response data of the mobile office access request comprises: the CPE performing back-to-origin on the mobile office access request to obtain the response data of the mobile office access request.

Wherein, when the mobile office access request is a mobile office access request encrypted according to a preset encryption algorithm, the method further comprises: the CPE decrypting the mobile office access request according to the preset encryption algorithm and sending the decrypted mobile office access request to a site server in the target network.

Wherein, in the step 2, after the acceleration network determines the target network of the mobile office access request, the method further comprises: determining the type of the target network, and when the target network is a public cloud network, determining an address of a site server in the public cloud network;

in the step 2, sending the mobile office access request to the target network comprises: a network access point nearest to the public cloud network in the acceleration network sending the mobile office access request to the site server in the public cloud network; and in the step 3, the target network obtaining response data of the mobile office access request comprises: the site server determining the response data of the mobile office access request.

Wherein, when the mobile office access request is a mobile office access request encrypted according to the preset encryption algorithm, sending the mobile office access request to the target network comprises: the network access point nearest to the public cloud network in the acceleration network decrypting the mobile office access request according to the preset encryption algorithm and sending the decrypted mobile office access request to the site server in the target network.

According to another aspect of the present application, a mobile office realization apparatus is provided, including:

a mobile office device configured to send a mobile office access request to an acceleration network;

an acceleration network configured to determine a target network of the mobile office access request and send the mobile office access request to the target network, and further configured to send response data received from the target network to the mobile office device; and a target network configured to obtain response data of the mobile office access request and send the response data to the acceleration network.

Wherein, the acceleration network comprises a permission management device; and the permission management device is configured to receive a registration request from the mobile office device and assign an access permission for the mobile office device, and further configured to verify whether the mobile office device is registered and has the access permission after receiving the mobile office access request.

The acceleration network comprises a network access point;

the network access point is configured to determine an address of Customer Premise Equipment CPE in a private network when the target network is a private network, and further configured to send the mobile office access request to the CPE in the private network;

when the target network is the private network, the target network comprises the CPE; and the CPE is configured to perform back-to-origin on the mobile office access request to obtain the response data of the mobile office access request.

Wherein, the CPE further comprises a decryption module and a sending module;

the decryption module is configured to decrypt the mobile office access request according to a preset encryption algorithm when the mobile office access request is a mobile office access request encrypted according to the preset encryption algorithm; and the sending module is configured to send the decrypted mobile office access request to a site server in the target network.

Wherein, the acceleration network comprises a network access point;

the network access point is configured to determine an address of a site server in a public cloud network when the type of the target network is a public cloud network, and further configured to send the mobile office access request to the site server in the public cloud network;

when the target network is the public cloud network, the target network comprises the site server; and the site server is configured to determine the response data of the mobile office access request and send the response data of the mobile office access request to the network access point.

Wherein, the network access point is configured to decrypt the mobile office access request according to the preset encryption algorithm after receiving the mobile office access request encrypted according to the preset encryption algorithm and send the decrypted mobile office access request to the target network when the network access point is a network access point nearest to the public cloud network in the acceleration network, and further configured to encrypt the response data according to the preset encryption algorithm after receiving the response data when the network access point is the network access point nearest to the public cloud network in the acceleration network.

According to another aspect of the embodiment of the present application, a computer device is provided, including a memory, a processor, and a computer program which is stored in the memory and may be operated in the processor. The steps of the above method are implemented when the computer program is executed by the processor.

According to another aspect of the embodiment of the present application, a computer readable storage medium in which a computer program is stored is provided. The steps of the above method are implemented when the program is executed by a processor.

The present application solves the problem of poor network quality when accessing public cloud networks and private networks during mobile office by introducing an acceleration network (such as an SD-WAN network), and takes the lead in deploying and expanding the enterprise network architecture to the cloud boundary, so that the experience in mobile office may be the same as that in the on-premises daily use. In addition, it is the first to introduce a trusted access permission to the apparatus, so that mobile office workers do not need to use login passwords frequently to log in to their account.

BRIEF DESCRIPTION OF THE DRAWINGS

The accompanying drawings, which constitute a part of the present application, are included to provide a further understanding of the present application. The exemplary embodiments of the present application and description thereof herein are only for explaining the present application, but not for unduly limiting the present application. In Figures.

DETAILED DESCRIPTION OF THE EMBODIMENTS

The technical schemes in the embodiments of the present application will be clearly and completely described as below with reference to the accompanying drawings in the embodiments of the present application. Obviously, the described embodiments are a part of, not all of, the embodiments of the present application. All other embodiments obtained by those of ordinary skill in the art based on the embodiments of the present application without paying any creative effort shall fall into the protection scope of the present application. It should be noted that the embodiments of the present application and the features in the embodiments can be arbitrarily combined with each other in the case of no conflict.

Figure 1:
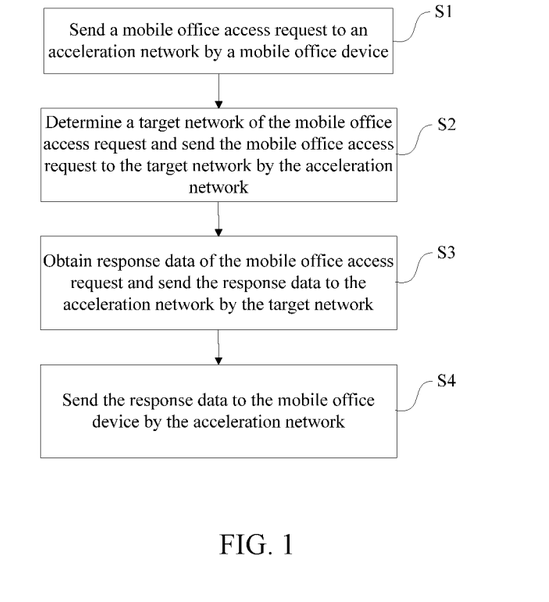
FIG. 1 is a flowchart of a mobile office realization method according to an exemplary embodiment.

As shown in FIG. 1, a mobile office realization method is provided, including following steps.

In a step 1, a mobile office device sends a mobile office access request to an acceleration network.

In a step 2, the acceleration network determines a target network of the mobile office access request and sends the mobile office access request to the target network.

In a step 3, the target network obtains response data of the mobile office access request and sends the response data to the acceleration network.

In a step 4, the acceleration network sends the response data to the mobile office device.

Wherein, the mobile office device may be computers, mobile phones, tablets and other device having the ability to connect to the Internet. The mobile office device in this method may be a common device loaded with application software that implements the processing mode of the method, e.g., a common device installed with a dedicated software Development Kit (SDK), or may be a dedicated device having the function of implementing the processing mode of the method, such as an external device having certain processing functions and connected with a computer, e.g., a USB device with diversion and encryption functions.

The mobile office device is registered in the acceleration network when connecting to the acceleration network for the first time. For example, the registration method is to send a unique identifier of the mobile office device to the acceleration network. When the mobile office device is a common device installed with the dedicated SDK, the unique identifier may be the unique identifier of the SDK, which is bound to the device, and the binding relationship cannot be changed. When the mobile office device is a dedicated device having the function of implementing the processing mode of the method, the unique identifier may be the unique identifier of the mobile office device.

The acceleration network receives a registration request from the mobile office device and assigns an access permission to the mobile office device. An access permission setting rule, by which the access permissions may be set for different mobile office device, may be configured in advance in the acceleration network. The access permission setting rule may be configured by the types of service. For example, different access permissions may be configured for OA system, ERP system, Portal system and other systems by the types of user (such as finance, personnel, development, operation and maintenance). For example, the access permissions may be configured for mobile phone users and PC users by the types of device. For example, the access permissions may be configured for different mobile office device. The access permission for some mobile office device is canceled after exceeding a preset duration. The use of a time-sensitive rule also eliminates the need for mobile office workers to use login passwords frequently to log in to their account.

Before the step 1, the method further includes: the mobile office device being registered in the acceleration network and obtaining an access permission. After the step 1 and before the step 2, the method further includes following steps of: the acceleration network verifying whether the mobile office device is registered and has the access permission, and preforming the step 2 only when verifying that the mobile office device is registered and has the access permission.

The target network may be of different types, such as a public cloud network and a private network. The private network may be the networks of enterprises' headquarters, branches and cloud computer room, and the public cloud network may be a SaaS network.

The target networks of different types will be described in detail below.

The first type of the target network is a private network.

In the step 2, after the acceleration network determines the target network of the mobile office access request, the method further includes: determining the type of the target network, and when the target network is a private network, determining an address of Customer Premise Equipment (CPE) in the private network.

In the step 2, sending the mobile office access request to the target network includes: a network access point nearest to the private network in the acceleration network sending the mobile office access request to the CPE in the private network.

In the step 3, the target network obtaining response data of the mobile office access request includes: the CPE performing back-to-origin on the mobile office access request to obtain the response data of the mobile office access request.

In order to improve data security, the mobile office device may encrypt the mobile office access request through SDK software and send it to the acceleration network which forwards the encrypted mobile office access request. The CPE decrypts the encrypted mobile office access request received according to the preset encryption algorithm and sends the decrypted mobile office access request to the site server in the target network.

In the step 3, the target network obtaining response data of the mobile office access request includes: the CPE performing back-to-origin on the mobile office access request to obtain the response data of the mobile office access request.

The process of encrypting and decrypting the response data includes after receiving the response data from the site server, the CPE encrypts the response data according to the preset encryption algorithm and forwards the encrypted response data to the acceleration network. After the step 4, the mobile office device decrypts the encrypted response data received through SDK software.

The second type of the target network system is a public cloud network.

In the step 2, after the acceleration network determines the target network of the mobile office access request, the method further include: determining the type of the target network, and when the target network is a public cloud network, determining an address of a site server in the public cloud network.

In the step 2, sending the mobile office access request to the target network includes: a network access point nearest to the public cloud network in the acceleration network sending the mobile office access request to the site server in the public cloud network.

In the step 3, the target network obtaining response data of the mobile office access request includes: the site server determining the response data of the mobile office access request.

In order to improve data security, the mobile office device may encrypt the mobile office access request through SDK software and send it to the acceleration network. The network access point nearest to the public cloud network in the acceleration network decrypts the mobile office access request according to the preset encryption algorithm, and sends the decrypted mobile office access request to the site server in the target network.

In the step 3, sending the response data to the acceleration network includes: the site server forwarding the response data to the network access point nearest to the public cloud network in the acceleration network.

The processing of encrypting and decrypting the response data includes: after the site server sends the response data to the acceleration network, the network access point nearest to the public cloud network in the acceleration network receiving the response data, encrypting the response data according to the preset encryption algorithm, and forwarding it through the network access point to the network access point nearest to the mobile office device in the acceleration network. After the step 4, the mobile office device decrypts the encrypted response data received through SDK software.

The acceleration network is typically a Software-Defined Wide Area Network (SD-WAN), which includes a plurality of network access points, i.e., Point-of-Presence (PoP). The SD-WAN is a private network of massive resources across the globe, which is accessed through PoP and dynamically routed internally to select an optimal back-to-origin path. In a typical application scenario, a plurality of access nodes of the enterprise Intranet in the same city as well as a plurality of back-to-origin nodes in the same city as the site server may be found through the SD-WAN, so that Extranet data needed by users may be obtained very quickly. In addition, data forwarded within the SD-WAN network are encrypted private data, which may effectively prevent data leakage and guarantee user data security.

Figure 2:
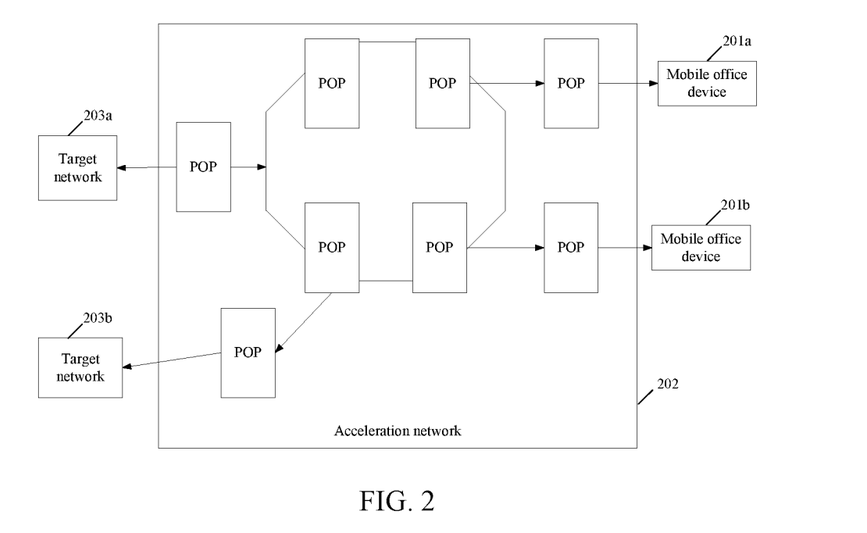
FIG. 2 is a block diagram of a mobile office realization apparatus according to an exemplary embodiment.

As shown in FIG. 2, a mobile office realization apparatus is provided, which includes:

a mobile office device, an acceleration network and a target network.

The mobile office device is configured to send a mobile office access request to an acceleration network.

The acceleration network is configured to determine a target network of the mobile office access request and send the mobile office access request to the target network, and further configured to send response data received from the target network to the mobile office device.

The target network is configured to obtain response data of the mobile office access request and send the response data to the acceleration network.

As shown in FIG. 2, the mobile office realization apparatus includes the mobile office devices, the acceleration network 202 and the target networks, wherein, the mobile office devices include a mobile office device 201a and a mobile office device 201b, and the target networks include a target network 301a and a target network 301b.

The acceleration network includes a permission management device which is configured to receive a registration request from the mobile office device and assign an access permission for the mobile office device, and further configured to verify whether the mobile office device is registered and has the access permission after receiving the mobile office access request. An access permission setting rule may be configured by the types of service or by the types of user device, or may be a time-sensitive rule. For example, the access permissions may be configured for different mobile office device. The access permission for a mobile office device is canceled after the duration of the mobile office device using the access permission exceeding a preset duration.

The target network may be of different types, such as a public cloud network and a private network. The private network may be the networks of enterprises' headquarters, branches and cloud computer room, and the public cloud network may be a SaaS network.

Figure 3:
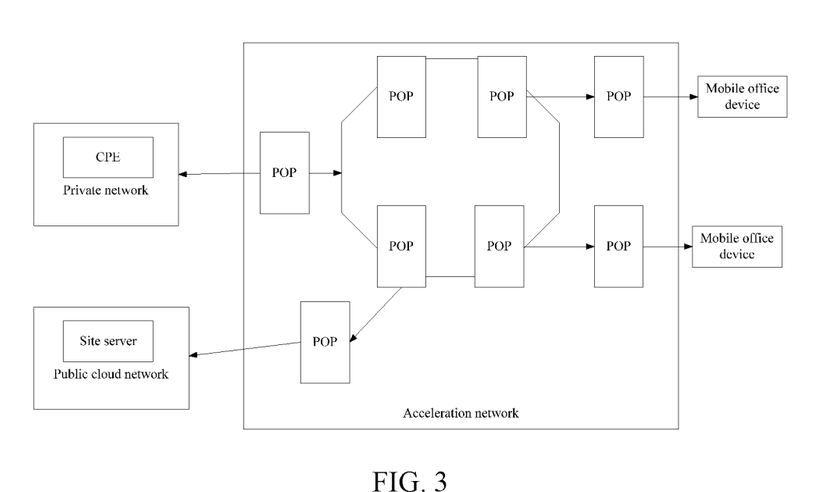
FIG. 3 is a block diagram of another mobile office realization apparatus according to an exemplary embodiment.

The target networks of different types will be described in detail below with reference to FIG. 3.

The first type of the target network is a private network.

When the target network is the private network, the target network includes the CPE.

The network access point is configured to determine an address of Customer Premise Equipment (CPE) in a private network when the target network is a private network, and further configured to send the mobile office access request to the CPE in the private network.

The CPE is configured to perform back-to-origin on the mobile office access request to obtain the response data of the mobile office access request.

The CPE further includes a decryption module and a sending module.

The decryption module is configured to decrypt the mobile office access request according to a preset encryption algorithm when the mobile office access request is a mobile office access request encrypted according to the preset encryption algorithm.

The sending module is configured to send the decrypted mobile office access request to the site server in the target network.

The CPE further includes an encryption module configured to encrypt the response data according to the preset encryption algorithm after receiving the response data from the site server in the target network.

The second type of the target network is a public cloud network.

When the target network is the public cloud network, the target network includes a site server.

The network access point is configured to determine an address of the site server in the public cloud network when the type of the target network is the public cloud network, and further configured to send the mobile office access request to the site server in the public cloud network.

The site server is configured to determine response data of the mobile office access request and send the response data of the mobile office access request to the network access point.

The network access point in the acceleration network includes an encryption module and a decryption module.

The encryption module is configured to encrypt the received response data when the network access point which the encryption module belongs to is the network access point nearest to the public cloud network in the acceleration network.

The decryption module is configured to decrypt the received encrypted access request when the network access point is the network access point nearest to the public cloud network in the acceleration network.

The steps of the method according to the embodiment of the present application may be rearranged, merged and deleted according to actual needs.

The modules in the mobile office realization method according to the embodiment of the present application may be merged, divided and deleted according to actual needs.

According to the embodiment of the present application, a computer-readable storage medium in which a computer program is stored is further provided. The steps of the above method are implemented when the program is executed by a processor.

According to the embodiment of the present application, a computer device is further provided, including a memory, a processor, and a computer program which is stored in the memory and may be operated in the processor. The steps of the above method are implemented when the computer program is executed by the processor.

Figure 4:
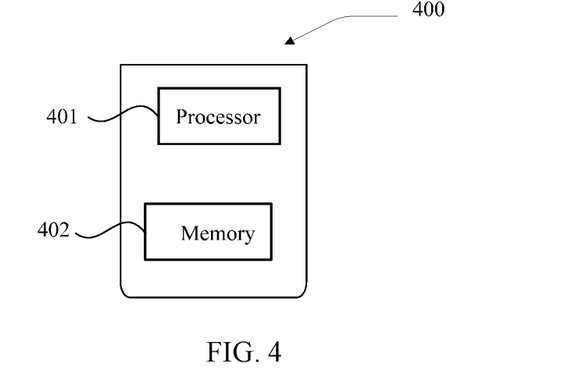
FIG. 4 is a block diagram of a device configured to implement the mobile office realization method according to an exemplary embodiment.

FIG. 4 is a block diagram of a device 400 configured to implement the mobile office realization method according to an exemplary embodiment. For example, the device 400 may be provided as a server. Referring to FIG. 4, the device 400 includes a processor 401, and there may be one or more processors as needed. The device 400 further includes a memory 402 configured to store instructions, such as application programs, executable by a processor 401. There may be one or more memories as needed, and there may be one or more application programs stored therein. The processor 401 is configured to execute the instructions to perform the above method.

It should be understood by those of skill in the art that embodiments of the present application may be provided as methods, apparatuses (devices), or computer program products. Therefore, the present application may take the form of an entirely hardware embodiment, an entirely software embodiment, or an embodiment containing both hardware and software elements. Furthermore, the present application may take the form of a computer program product implemented on one or more computer usable storage media containing computer usable program codes therein. The computer storage medium includes volatile and nonvolatile, removable and non-removable media implemented in any method or technology for storing information (such as computer readable instructions, data structures, program modules or other data), including but not limited to RAM, ROM, EEPROM, flash memory or other memory technologies, CD-ROM, digital versatile disk (DVD) or other optical disk storage, magnetic cartridges, magnetic tapes, disk storage or other magnetic storage devices, or any other media that may be adopted to store desired information and may be accessed by a computer. Furthermore, it is well known to those of ordinary skilled in the art that communication media typically contain computer-readable instructions, data structures, program modules, or other data in modulated data signals such as carrier waves or other transmission mechanisms, and may include any information delivery media.

The present application is described with reference to flowcharts and/or block diagrams of the method, apparatus (device) and computer program product according to embodiments of the present application. It should be understood that each process and/or block in the flowchart and/or block diagram, and combinations of processes and/or blocks in the flowchart and/or block diagram may be implemented by computer program instructions. These computer program instructions may be provided to a processor of a general-purpose computer, a special-purpose computer, an embedded processor or other programmable data processing devices to produce a machine, such that the instructions executed by the processor of the computer or other programmable data processing devices produce a means for implementing the functions specified in one or more processes of the flowchart and/or one or more blocks of the block diagram.

These computer program instructions may also be stored in a computer-readable memory capable of directing a computer or other programmable data processing devices to operate in a specific manner, such that the instructions stored in the computer-readable memory produce an article of manufacture containing an instruction means that implements the functions specified in one or more processes of the flowchart and/or one or more blocks of the block diagram.

These computer program instructions may also be loaded onto a computer or other programmable data processing devices, such that a series of operational steps are performed on the computer or other programmable devices to produce a computer-implemented process, and the instructions executed on the computer or other programmable devices provide steps for implementing the functions specified in one or more processes of the flowchart and/or one or more blocks of the block diagram.

As used herein, the terms "including," "includes" or any other variation thereof are intended to cover non-exclusive inclusion, so that an article or device including a series of elements includes not only those elements, but also other elements not explicitly listed, or elements inherent to such an article or device. Without further limitation, the elements defined by the statement "including . . . " or "includes . . . " do not preclude the existence of additional identical elements in the article or device including the elements.

Although preferred embodiments of the present application have been described, those of skill in the art may make additional alterations and modifications to these embodiments once they know the basic inventive concepts. Therefore, the appended claims are intended to be interpreted as including the preferred embodiments and all alterations and modifications that fall within the scope of the present application.

Obviously, those of skill in the art may make various modifications and variations to the present application without departing from the spirit and scope of the present application. In this way, if these modifications and variations of the present application fall within the scope of the claims of the present application and their equivalent technologies, the intent of the present application encompasses these modifications and variations as well.

INDUSTRIAL APPLICABILITY

The present application solves the problem of poor network quality when the mobile office accessing public cloud networks and private networks by introducing an acceleration network (such as an SD-WAN network), and takes the lead in deploying and expanding the enterprise network architecture to the cloud boundary, so that the experience in mobile office may be the same as that in the on-premises daily use. In addition, it is the first to introduce a trusted access permission to the device, so that mobile office workers do not need to use login passwords frequently to log in to their account.

The invention claimed is:

1. A mobile office realization method comprising, by an acceleration network:

receiving a mobile office access request from a mobile office device;
determining a target network of the mobile office access request;
after determining the target network:
  determining a type of the target network; and
  in response to determining that the target network is a private network, determining an address of Customer Premise Equipment (CPE) in the private network;
sending the mobile office access request to the target network, including controlling a first nearest network access point in the acceleration network to send the mobile office access request to the CPE in the private network, the first nearest network access point being nearest to the private network among a plurality of network access points in the acceleration network;
receiving, from the target network, response data of the mobile office access request obtained by the CPE in the target network performing back-to-origin on the mobile office access request; and
sending the response data to the mobile office device.

2. The mobile office realization method according to claim 1, further comprising:
before receiving the mobile office access request, receiving a registration request from the mobile office device and assigning an access permission for the mobile office device; and
after receiving the mobile office access request and before determining the target network, verifying whether the mobile office device is registered and has the access permission;
wherein determining the target network includes determining the target network in response to verifying that the mobile office device is registered and has the access permission.

3. The mobile office realization method according to claim 1, wherein:
the mobile office access request is encrypted according to a preset encryption algorithm; and
the mobile office access request is decrypted by the CPE according to the preset encryption algorithm and sent to a site server in the target network.

4. The mobile office realization method according to claim 1, further comprising, after determining the target network:
in response to determining that the target network is a public cloud network, determining an address of a site server in the public cloud network;
wherein:
  sending the mobile office access request to the target network includes controlling a second nearest network access point in the acceleration network to send the mobile office access request to the site server in the public cloud network, the second nearest network access point being nearest to the public cloud network among the plurality of network access points in the acceleration network; and
  the response data is determined by the site server.

5. The mobile office realization method according to claim 4, wherein:
the mobile office access request is encrypted according to a preset encryption algorithm; and
controlling the second nearest network access point to send the mobile office access request to the target network includes controlling the second nearest network access point to decrypt the mobile office access request according to the preset encryption algorithm and send the decrypted mobile office access request to the site server in the target network.

6. A non-transitory computer-readable storage medium storing a computer program that, when executed by a processor, causes the processor to perform the method according to claim 1.

7. A mobile office realization apparatus comprising:
a mobile office device configured to send a mobile office access request;
an acceleration network configured to:
  receive the mobile office access request from the mobile office device;
  determine a target network of the mobile office access request; and
  send the mobile office access request; and
a target network configured to:
  receive the mobile office access request from the acceleration network;
  obtain response data of the mobile office access request; and
  send the response data to the acceleration network;
wherein the acceleration network is further configured to:
  receive the response data from the target network; and
  send the response data to the mobile office device.

8. The mobile office realization apparatus according to claim 7, wherein the acceleration network is further configured to:
receive a registration request from the mobile office device;
assign an access permission for the mobile office device; and
verify whether the mobile office device is registered and has the access permission after receiving the mobile office access request.

9. The mobile office realization apparatus according to claim 7, wherein:
the target network is the private network including Customer Premise Equipment (CPE);
the acceleration network includes a network access point configured to:
  determine an address of the CPE in the private network; and
  send the mobile office access request to the CPE in the private network; and
the CPE is configured to perform back-to-origin on the mobile office access request to obtain the response data of the mobile office access request.

10. The mobile office realization apparatus according to 9, wherein:
the mobile office access request is encrypted according to a preset encryption algorithm; and
the CPE is further configured to:
  decrypt the mobile office access request according to the preset encryption algorithm; and
  send the decrypted mobile office access request to a site server in the target network.

11. The mobile office realization device according to claim 7, wherein:
the target network is a public cloud network including a site server;
the acceleration network includes a network access point configured to:
  determine an address of the site server in the public cloud network; and
  send the mobile office access request to the site server in the public cloud network; and the site server is configured to determine the response data of the mobile office access request and send the response data of the mobile office access request to the network access point.

12. The mobile office realization apparatus according to claim 11, wherein:
the mobile office access request is encrypted according to a preset encryption algorithm;
the network access point is nearest to the public cloud network among a plurality of network access points in the acceleration network; and
the network access point is configured to:
  decrypt the mobile office access request according to the preset encryption algorithm after receiving the mobile office access request;
  send the decrypted mobile office access request to the target network; and
  encrypt the response data according to the preset encryption algorithm after receiving the response data.

13. A computer device in an acceleration network comprising:
a memory storing a computer program; and
a processor configured to execute the computer program to:
  receive a mobile office access request from a mobile office device;
  determine a target network of the mobile office access request;
  after determining the target network:
    determine a type of the target network;
    in response to determining that the target network is a private network, determine an address of Customer Premise Equipment (CPE) in the private network;
  send the mobile office access request to the target network, including controlling a first nearest network access point in the acceleration network to send the mobile office access request to the CPE in the private network, the first nearest network access point being nearest to the private network among a plurality of network access points in the acceleration network;
  receive, from the target network, response data of the mobile office access request obtained by the CPE in the target network performing back-to-origin on the mobile office access request; and
  send the response data to the mobile office device.

14. The computer device according to claim 13, wherein the processor is further configured to execute the computer program to:
before receiving the mobile office access request, receive a registration request from the mobile office device and assign an access permission for the mobile office device;
after receiving the mobile office access request and before determining the target network, verify whether the mobile office device is registered and has the access permission; and
determine the target network in response to verifying that the mobile office device is registered and has the access permission.

15. The computer device according to claim 13, wherein:
the mobile office access request is encrypted according to a preset encryption algorithm; and
the mobile office access request is decrypted by the CPE according to the preset encryption algorithm and sent to a site server in the target network.

16. The computer device according to claim 13, wherein:
the processor is further configured to execute the computer program to, after determining the target network:
  in response to determining that the target network is a public cloud network, determine an address of a site server in the public cloud network; and
  control a second nearest network access point in the acceleration network to send the mobile office access request to the site server in the public cloud network, the second nearest network access point being nearest to the public cloud network among the plurality of network access points in the acceleration network; and
the response data is determined by the site server.

17. The computer device according to claim 16, wherein:
the mobile office access request is encrypted according to a preset encryption algorithm; and
the processor is further configured to execute the computer program to control the second nearest network access point to decrypt the mobile office access request according to the preset encryption algorithm and send the decrypted mobile office access request to the site server in the target network.

* * * * *